US012562173B2

(12) United States Patent　　　　　(10) Patent No.:　　US 12,562,173 B2
Candelore et al.　　　　　　　　　　(45) Date of Patent:　　Feb. 24, 2026

(54) WEARABLE DEVICE CONTROL BASED ON VOICE COMMAND OF VERIFIED USER

(71) Applicant: SONY GROUP CORPORATION, Tokyo (JP)

(72) Inventors: Brant L Candelore, Poway, CA (US); Mahyar Nejat, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 463 days.

(21) Appl. No.: 18/064,669

(22) Filed: Dec. 12, 2022

(65) Prior Publication Data

US 2024/0194205 A1　　Jun. 13, 2024

(51) Int. Cl.
　　*G10L 17/24*　　　(2013.01)
　　*G06F 3/16*　　　(2006.01)
　　*H04R 1/10*　　　(2006.01)
(52) U.S. Cl.
　　CPC ............. *G10L 17/24* (2013.01); *G06F 3/167* (2013.01); *H04R 1/1091* (2013.01)
(58) Field of Classification Search
　　CPC ....... G10L 17/24; G06F 3/167; H04R 1/1091; H04R 1/1041
　　See application file for complete search history.

(56) References Cited

U.S. PATENT DOCUMENTS

| | | | | |
|---|---|---|---|---|
| 10,593,328 B1 * | 3/2020 | Wang | .................. | H04L 65/1059 |
| 11,295,743 B1 * | 4/2022 | Bumberger | ............. | G10L 15/02 |
| 2014/0126733 A1 * | 5/2014 | Gauger, Jr. | ........ | G10K 11/1783 |
| | | | | 381/71.6 |
| 2018/0054683 A1 * | 2/2018 | Pedersen | .............. | H04R 25/554 |
| 2018/0211667 A1 * | 7/2018 | Haubrich | ............. | H04R 25/558 |
| 2018/0240463 A1 * | 8/2018 | Perotti | .................... | G10L 17/22 |
| 2018/0336892 A1 * | 11/2018 | Kim | ........................ | H04R 3/005 |
| 2020/0411014 A1 * | 12/2020 | Asher | ..................... | G10L 17/04 |
| 2022/0272055 A1 * | 8/2022 | Carbune | ........... | H04M 1/72454 |

FOREIGN PATENT DOCUMENTS

| | | |
|---|---|---|
| CN | 111698625 A | 9/2020 |
| CN | 108200523 B | 8/2021 |
| DE | 102018209719 A1 | 7/2019 |
| EP | 3148221 B1 | 6/2021 |

* cited by examiner

*Primary Examiner* — Paras D Shah
(74) *Attorney, Agent, or Firm* — CHIP LAW GROUP

(57)　　　　　　　ABSTRACT

A wearable device and method for control of the wearable device based on a voice of a verified user is provided. The wearable device receives a first user input and generates a challenge key-phrase based on the first user input. The wearable device renders a message including the challenge key-phrase through an audio output device of the wearable device. The wearable device captures first audio signals corresponding to the rendered message and determines whether the first audio signals include the challenge key-phrase. The wearable device verifies a user if the first audio signals include the challenge key-phrase. The wearable device captures second audio signals corresponding to a second user input including a voice command, based on the verification of the user. The wearable device controls a feature or a setting of the wearable device or an electronic device associated with the wearable device, based on the voice command.

19 Claims, 6 Drawing Sheets

600

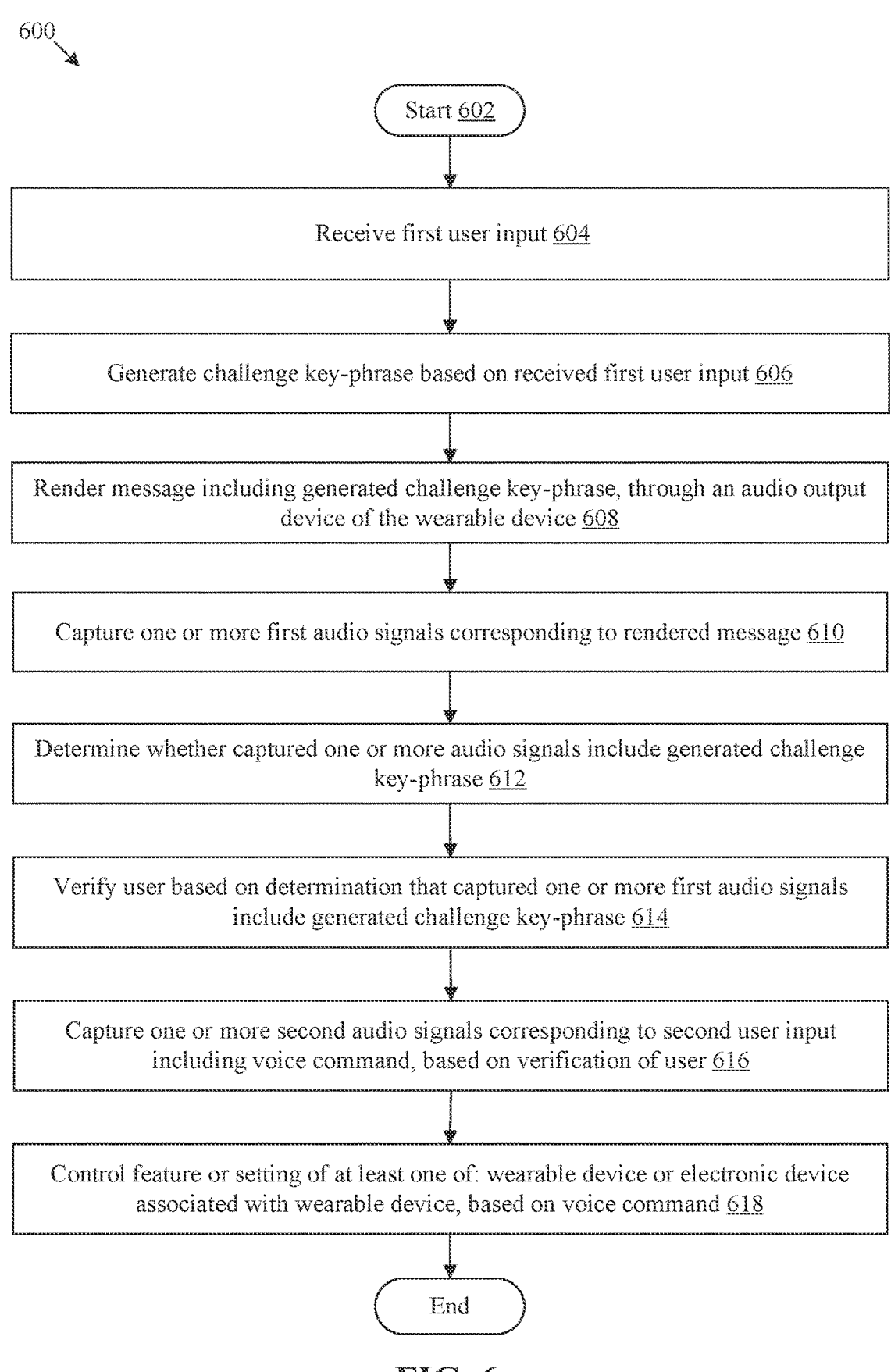

Start 602

Receive first user input 604

Generate challenge key-phrase based on received first user input 606

Render message including generated challenge key-phrase, through an audio output device of the wearable device 608

Capture one or more first audio signals corresponding to rendered message 610

Determine whether captured one or more audio signals include generated challenge key-phrase 612

Verify user based on determination that captured one or more first audio signals include generated challenge key-phrase 614

Capture one or more second audio signals corresponding to second user input including voice command, based on verification of user 616

Control feature or setting of at least one of: wearable device or electronic device associated with wearable device, based on voice command 618

End

FIG. 6

WEARABLE DEVICE CONTROL BASED ON VOICE COMMAND OF VERIFIED USER

CROSS-REFERENCE TO RELATED APPLICATIONS/INCORPORATION BY REFERENCE

None.

FIELD

Various embodiments of the disclosure relate to voice command based electronic device control. More specifically, various embodiments of the disclosure relate to a wearable device and a method for control of the wearable device or at least one electronic device based on a voice command of a verified user.

BACKGROUND

Advancements in the field of electronics have led to development of wearable devices of various types. The wearable devices may be worn by a user over a certain anatomical region of the user. Recently, there has been a proliferation of voice-enabled devices. A voice-enabled wearable device may be controlled based on voice commands of a user who wears the wearable device. However, in certain scenarios, the user may be located in an environment that may be exposed to ambient noise. The ambient noise may interfere with the voice commands of the user and thereby increase the complexity involved in usage and control of the wearable device. Due to the ambient noise, sometimes, the voice command may be interpreted wrongly by the wearable device, which may lead to an accidental activation or deactivation of a certain feature of the wearable device. Such accidental activation or deactivation of the particular feature, though unintentional, may hamper the usage of the wearable device for the user. Further, devices with speakers may be configured to play sound loudly, which may to harm the user's hearing.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A wearable device and method for control of the wearable device or at least one electronic device based on a voice command received from a verified user, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 6 is a flowchart that illustrates operations for an exemplary method for control of settings or features of a wearable electronic device and/or an electronic device based on a voice command of a verified user, in accordance with an embodiment of the disclosure.

DETAILED DESCRIPTION

Figure 1:
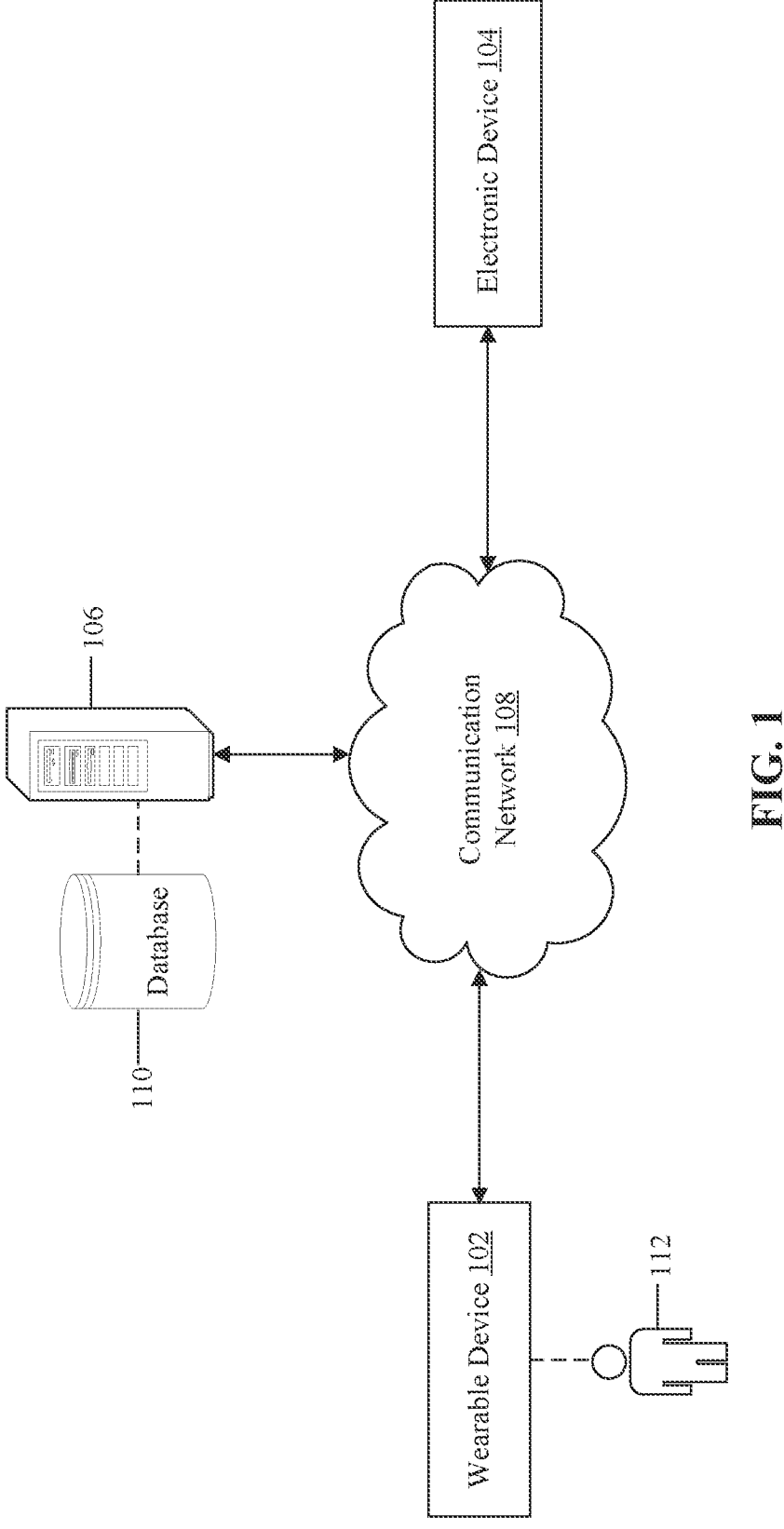
FIG. 1 is a diagram that illustrates an exemplary network environment for control of a wearable device or an electronic device, based on a voice command received from a verified user, in accordance with an embodiment of the disclosure.

The following described implementations may be found in a disclosed wearable device and method for control of the wearable device or at least one electronic device based on a voice command received from a verified user. Exemplary aspects of the disclosure provide a wearable device (for example, a hearing-aid device, smart glasses, a headphone, and so on) that may have a capability to verify a user who wears the wearable device and further control the wearable device (or the at least one electronic device) based on the voice command of the verified user. The wearable device may receive a first user input (such as, a voice-based input or a touch-based input) from the user who wears the wearable device. The wearable device may generate a challenge key-phrase (for example, a set of words) based on the received first user input. The wearable device may render (audibly) a message that may include the generated challenge key-phrase, through an audio output device of the wearable device. The wearable device may capture one or more first audio signals corresponding to the rendered message. The wearable device may determine whether the captured one or more audio signals include the generated challenge key-phrase. The wearable device may verify the user based on the determination that the captured one or more first audio signals include the generated challenge key-phrase. The wearable device may capture one or more second audio signals corresponding to a second user input that may include the voice command from the user, based on the authentication of the user. The wearable device may control a feature (for example, a voice assistant feature) or a setting (for example, a volume setting or a network setting)

of at least one of the wearable device or the electronic device associated with the wearable device, based on the voice command.

Typically, a voice-enabled wearable device may have the capability to respond to voice commands of a user who wears the wearable device. However, there may be issues associated with a usage and control of the wearable device. For example, if an environment of the user is exposed to ambient noise, voice recognition of the user may be inaccurate or complex and it may be difficult to identify whether a detected voice command has been issued by the user who wears the wearable device. There may be unforeseen consequences in an event of execution of a voice command, by the wearable device, that has not been issued by the user wearing the wearable device. For example, the wearable device may be a hearing-aid. In a noisy environment, the hearing-aid may detect a voice command to reduce the volume of the hearing-aid. The voice command may be issued by an individual in the vicinity of the user who wears the hearing-aid. In this scenario, if there is a failure in recognition of the user's voice and the voice command is executed, the hearing-aid may become unusable by the user due to a low volume of the hearing-aid. For example, in such scenario, the user who wears the hearing-aid may not be able to hear ambient sounds due to the reduction of the volume of the hearing-aid and may also not be able to determine the cause as to why the user is unable to hear the ambient sounds. In another scenario, the hearing-aid accidently configured to boost sound too much which may harm the user's hearing in a long term.

In order to address such issues, the disclosed wearable device may enable the authentication of the user who wears the wearable device, based on a response spoken by the user to a message that may be generated by the wearable device and accessible only to the user who wears the wearable device. The wearable device may generate a challenge key-phrase and render a message that includes the generated challenge key-phrase. The rendered message may be accessible only to the user. The user may be verified if the received spoken response to the rendered message includes the generated challenge key-phrase. Thus, the authentication may be user-specific and other users in the vicinity of the user (who wears the wearable device) may not be able to predict the challenge key-phrase that may be generated by the wearable device to respond to the rendered message.

The wearable device may further enable the control of features and settings of the wearable device and other electronic devices associated with the wearable device, once the user has been verified. For example, the wearable device may include limited functionalities and capabilities, such as a small display and resolution, limited natural language processing capabilities, and limited user interface (UI) features. The control of the features and settings of the wearable device and/or the other electronic devices based on limited user interface elements and limited display resources of the wearable devices may be cumbersome. The wearable device of the disclosure may provide voice commands-based control of the wearable device and/or other electronic devices, once the user may be verified. The voice command-based control may be an elegant solution to as compared to other commands through the limited user interface elements and limited touch-based display resources, as a voice command may be issued easily by the user without the use of the limited UI elements of the wearable device. Also, as the user may be verified based on the user's response to the challenge message (i.e., played back exclusively to the user), such authentication may ensure that the voice command may be received from a genuine user who actually wears the wearable device at that time. No other person may be able to predict the challenge message as the voice command may be played back exclusively to the user who wears the wearable device. Thus, unwanted voice commands or noise may be filtered-out and the wearable device and/or the electronic device may be appropriately controlled based on the voice command.

FIG. 1 is a diagram that illustrates an exemplary network environment for control of a wearable device or an electronic device, based on a voice command received from a verified user, in accordance with an embodiment of the disclosure. With reference to FIG. 1, there is shown a network environment 100. The network environment 100 includes a wearable device 102, an electronic device 104, and a server 106. The wearable device 102 may communicate with the electronic device 104 and/or the server 106, through one or more networks (such as, a communication network 108). The server 106 may be communicatively coupled to a database 110. There is further shown a user 112 associated with the wearable device 102. For example, the wearable device 102 may be worn over an anatomical portion (e.g., a wrist or head) of the user 112.

The wearable device 102 may include suitable logic, circuitry, interfaces, and/or code that may be configured to verify the user 112 and control settings and/or features of the wearable device 102 or the electronic device 104 based on voice commands of the (verified) user 112. The wearable device 102 may generate a challenge key-phrase. The wearable device 102 may render the challenge key-phrase to the user 112 via a message (e.g., an audio or video notification). The wearable device 102 may, further, capture one or more first audio signals that may correspond to a spoken response of the user 112 to the rendered message. The wearable device 102 may verify the user 112 if the captured audio signal includes the challenge key-phrase. The wearable device 102 may capture one or more second audio signals that may include a voice command of the user 112 who may be verified. The wearable device 102 may control the settings and/or features of the wearable device 102 or the electronic device 104 associated with the wearable device 102 based on the voice command of the user 112. Examples of the wearable device 102 may include, but are not limited to, a hearing-aid device, a headphone, smart glasses, a shoulder speaker, a neckband, a head mountable display (HMD), a heads-up display (HUD), an augmented reality (AR) goggle, a virtual reality (VR) goggle, and so on. The headphone, smart glasses, shoulder speaker, neckband, HMD, HUD, AR goggle, or VR goggle, may be equipped with an ability to receive ambient sound including audio from the user 112.

The electronic device 104 may include suitable logic, circuitry, interfaces, and/or code that may be configured to receive commands from the wearable device 102. The electronic device 104 may adjust a setting of the electronic device 104 or manage usage of a feature of the electronic device 104 based on the received commands. The received commands may correspond to the voice commands of the user 112. The electronic device 104 may receive the commands from the wearable device 102 based on authentication of the user 112 by the wearable device 102. Examples of the electronic device 104 may include, but are not limited to, a voice assistant capable of controlling at least one electronic device, an electronically controlled lighting fixture, a desktop, a tablet, a television (TV), a laptop, a computing device, a smartphone, a cellular phone, a mobile phone, a consumer electronic (CE) device with a display, a digital signage, a video wall (which may include two or more displays tiled together contiguously or overlapped in order to form one large screen), or an edge device connected to a user's home network or an organization's network. In some embodiments, the network environment 100 may include multiple electronic devices (such as, the electronic device 104) with functionalities similar to the electronic device 104. For the sake of brevity, a single electronic device (for example, the electronic device 104) is shown.

The server 106 may include suitable logic, circuitry, interfaces, and/or code that may be configured to receive audio signals from the wearable device 102 that may be captured by the wearable device 102. The server 106 may be configured to extract content of a received audio signal and/or identify a voice of the user 112 from the received audio signal. The server 106 may transmit indications about presence of the challenge key-phrase in the received audio signal. In some embodiments, the server 106 may be configured to store a set of words that may be used for construction of a challenge key-phrase. The server 106 may transmit the set of words to the wearable device 102 upon reception of a request for the set of words from the wearable device 102. The server 106 may execute operations through web applications, cloud applications, HTTP requests, repository operations, file transfer, and the like. Example implementations of the server 106 may include, but are not limited to, a database server, a file server, a web server, an application server, a mainframe server, a cloud computing server, or a combination thereof.

In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the wearable device 102 as two separate entities. In certain embodiments, the functionalities of the server 106 can be incorporated in its entirety or at least partially in the wearable device 102, without a departure from the scope of the disclosure.

The communication network 108 may include a communication medium through which the wearable device 102, the electronic device 104, and the server 106 may communicate with each other. The communication network 108 may be a wired or wireless communication network. Examples of the communication network 108 may include, but are not limited to, Internet, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The database 110 may include suitable logic, interfaces, and/or code that may be configured to store the information associated with characteristics of the voice of the user 112 that may enable an identification of the voice of the user 112 in an audio signal received by the server 106 (from the wearable device 102). The database 110 may further store the set of words that may be used for the construction of challenge key-phrases. The database 110 may be derived from data off a relational or non-relational database or a set of comma-separated values (csv) files in conventional or big-data storage. The database 110 may be stored or cached on a device, such as the server 106. The device that may host or store the database 110 may be configured to receive a query for the information associated with the characteristics of the voice of the user 112 from the wearable device 102. The device that may host or store the database 110 may further receive a query for the set of words from the wearable device 102. In response to the reception of such queries, the device that may host or store the database 110 may be configured to retrieve, from the database 110, results (for example, the characteristics of the voice of the user 112 or the set of words) based on the received query.

In some embodiments, the database 110 may be hosted on a plurality of servers stored at same or different locations. The operations of the database 110 may be executed using hardware including a processor, a microprocessor (e.g., to perform or control performance of one or more operations), a field-programmable gate array (FPGA), or an application-specific integrated circuit (ASIC). In some other instances, the database 110 may be implemented using software.

In operation, the wearable device 102 may be configured to receive a first user input from the user 112. The wearable device 102 may be worn on an anatomical portion of the user 112, such as, on an ear of the user 112, or the head of the user 112. The first user input may be a voice-based input or a touch-based input. The first user input may be received from the user 112 based on an intention of the user 112 to control a feature or a setting of the wearable device 102 or the electronic device 104. Based on the reception of the first user input, the wearable device 102 may be configured to trigger a user-authentication procedure that may enable reception of voice commands from the user 112.

The wearable device 102 may be further configured to generate a challenge key-phrase based on the received first user input. In accordance with an embodiment, the generated challenge key-phrase may include a set of words. For example, the challenge key-phrase may be "I am happy". The wearable device 102 may verify the user 112, for reception of voice commands from the user 112, based on the challenge key-phrase. The user 112 may be verified if the challenge key-phrase is detected in a response of the user 112 spoken to a rendered message that includes the challenge key-phrase. The wearable device 102 may generate another challenge key-phrase on reception of another first user input. For example, the wearable device 102 may verify the user 112 before each voice command of the user 112.

The wearable device 102 may be further configured to render a message that includes the generated challenge key-phrase. For example, the rendered message (that includes the generated challenge key-phrase) may be "say 'I am happy'". In accordance with an embodiment, the wearable device 102 may render the message through an audio output device. The audio output device may render an audio message based on a playback of the message, for example, "say 'I am happy'". The message may also be rendered visually or audio-visually. For example, the wearable device 102 may be a head-mounted device or smart glasses with in-built audio output device that may render the message visually or audio-visually.

The wearable device 102 may be further configured to capture one or more first audio signals corresponding to the rendered message. The one or more first audio signals may be captured through an audio input device. In accordance with an embodiment, the one or more first audio signals may be captured based on delivery of a spoken response, by the user 112, to the rendered message that includes the challenge key-phrase. The user 112 may recite the spoken response (that includes the generated challenge key-phrase) to the rendered message (for example, an audio message, a visual text message, or an audio-visual message) that includes the generated challenge key-phrase.

The wearable device 102 may be further configured to determine whether the captured one or more first audio signals include the generated challenge key-phrase. In accordance with an embodiment, the wearable device 102 may determine an inclusion or an absence of the generated challenge key-phrase in the captured one or more first audio signals based on application of a natural language processing (NLP) model (e.g., an NLP model 212 of FIG. 2) on the captured one or more first audio signals.

The wearable device 102 may be further configured to verify the user 112 based on the determination that the captured one or more first audio signals include the generated challenge key-phrase. The wearable device 102 may detect, in the captured one or more first audio signals, the spoken response of the user 112 to the rendered challenge key-phrase. In some embodiments, the detection may be based on application of the natural language processing model (such as, the NLP model 212 of FIG. 2) on the captured one or more first audio signals. The user 112 may be verified based on the determination that the generated challenge key-phrase is included in the detected spoken response of the user 112. The user 112 may not be verified if the detected spoken response of the user 112 does not include the generated challenge key-phrase.

The wearable device 102 may be further configured to capture one or more second audio signals that correspond to a second user input including a voice command, based on the authentication of the user 112. The voice command may be provided by the user 112 as the second user input. In accordance with an embodiment, the wearable device 102 may detect, in the captured one or more second audio signals, the voice command. The voice command may be detected based on an application of the natural language processing model (such as, the NLP model 212 of FIG. 2) on the one or more captured second audio signals. The wearable device 102 may determine one or more instructions specified by the user 112 through the voice command, based on, for example, the natural language processing model (such as, the NLP model 212 of FIG. 2). The one or more instructions may be associated with control of the features or settings of the wearable device 102 or the electronic device 104.

The wearable device 102 may be further configured to control a feature or a setting of at least one of the wearable device 102 or at least one electronic device (such as, the electronic device 104 or one or more other electronic devices (not shown in FIG. 1) similar to the electronic device 104) associated with the wearable device 102, based on the voice command. For example, the feature may be a voice assistance feature. The voice assistance feature of the wearable device 102 or the electronic device 104 may be unlocked based on authentication of the user 112, and the receipt of a voice command to unlock the voice assistance feature. In some embodiments, the voice assistance feature may be unlocked for a predefined time period. The (verified) user 112 may utilize the voice assistance feature to issue the voice command within the predefined time period. The wearable device 102 may control a setting (for example, a volume setting, a display setting, or a network setting) of the wearable device 102 or the electronic device 104 based on the voice command.

Figure 2:
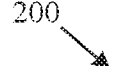
FIG. 2 is a block diagram that illustrates an exemplary wearable device of FIG. 1, for control of the wearable electronic device and an electronic device based on a voice command of a verified user, in accordance with an embodiment of the disclosure.
Figure 2:
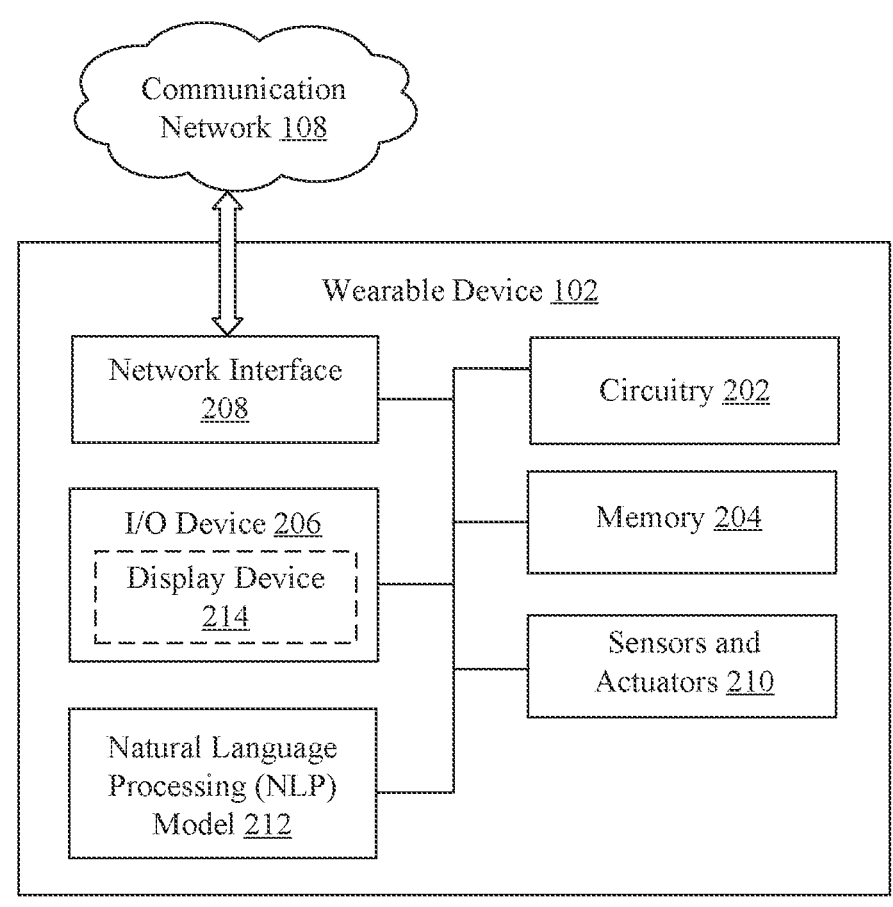

FIG. 2 is a block diagram that illustrates an exemplary wearable device of FIG. 1, for control of the wearable electronic device and an electronic device based on a voice command of a verified user, in accordance with an embodiment of the disclosure. FIG. 2 is explained in conjunction with elements from FIG. 1. With reference to FIG. 2, there is shown a block diagram 200 of the wearable device 102. The wearable device 102 may include circuitry 202, a memory 204, an input/output (I/O) device 206, a network interface 208, sensors and actuators 210, and a natural language processing (NLP) model 212. In at least one embodiment, the I/O device 206 may also include a display device 214. The circuitry 202 may be communicatively coupled to the memory 204, the I/O device 206, the network interface 208, and the natural language processing (NLP) model 212, through wired or wireless communication of the wearable device 102.

The circuitry 202 may include suitable logic, circuitry, and interfaces that may be configured to execute program instructions associated with different operations to be executed by the wearable device 102. The operations may include reception of the first user input, the generation of the challenge key-phrase, the render of the message including the generated challenge key-phrase, and the capture of one or more first audio signals corresponding to the rendered message. The operations may further include the determination of whether the captured one or more first audio signals include the generated challenge key-phrase. The operations may further include the authentication of the user 112, the capture of one or more second audio signals and the control of the feature or the setting of at least one of the wearable device 102 or an electronic device 104 associated with the wearable device 102, based on the voice command. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The program instructions stored on the memory 204 may enable the circuitry 202 to execute operations of the circuitry 202 (and/or the wearable device 102). In at least one embodiment, the memory 204 may store a template of a key-phrase (for example, "Say the word"), and a set of keywords (for example, "sky", "hello", "happy", and so on). The circuitry 202 may select a keyword of the set of keywords, to be included with the key phrase template, to generate the challenge key phrase (for example, "Say the word 'hello'"). The memory 204 may further store voice characteristics of the user 112 (in a voice model) that may facilitate an identification of a voice the user 112. In some embodiments, the memory 204 may further store the NLP model 212. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive the first user input from the users 112, that may indicate a user-intention to control a feature or a setting of the wearable device 102 or the electronic device 104. In some embodiments, the I/O device 206 may receive a touch input from the user 112 based on the capture of the one or more second audio signals by the circuitry 202. The I/O device 206 may render a message that includes the challenge key-phrase, generated by the wearable device 102, to verify the user 112. Examples of the I/O device 206 may include, but are not limited to, a touch screen, a keyboard, a mouse, a joystick, a microphone, the display device 214, and a speaker.

The I/O device 206 may include the display device 214. The display device 214 may include suitable logic, circuitry, and interfaces that may be configured to receive inputs from the circuitry 202 to render, on a display screen, a text message that includes the challenge key-phrase. In some embodiments, the display device 214 may be configured to display notifications that may indicate whether the user 112 has been verified by the circuitry 202, based on a spoken response from the user 112 (detected in one or more first audio signals captured by the circuitry 202). The display device 214 may be further configured to render a current status of one or more settings of the wearable device 102 or the electronic device 104. In at least one embodiment, the display screen may be a touch screen including at least one of a resistive touch screen, a capacitive touch screen, or a thermal touch screen. In case the display screen is a touch screen, the display device 214 may also be configured to receive the first user input that may indicate the user-intention to control the feature or the setting and/or receive the touch input based on the capture of the one or more second audio signals. The display device 214 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202, the electronic device 104, and the server 106, via the communication network 108. The network interface 208 may be implemented by use of various known technologies to support wired or wireless communication of the wearable device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a near field communication protocol, and a wireless pear-to-pear protocol.

The sensors and actuators 210 may include suitable logic, circuitry, and/or interfaces that may be configured to capture the one or more first audio signals (that include the generated challenge key-phrase), and the captured one or more second audio signals (that correspond to the second user input including the voice command). The one or more first audio signals and the one or more second audio signals may be captured by an audio input device. The audio input device may constitute one or more sensors that may convert the one or more first audio signals and the one or more second audio signals into electrical signals. The electrical signals may be processed by the circuitry 202 of the wearable device 102. The sensors and actuators 210 may be further configured to render the challenge key-phrase generated by the circuitry 202. The challenge key-phrase may be rendered via an audio output device. The audio output device may correspond to one or more actuators that may convert electrical signals into audio signals for rendering. Examples of sensors and actuators 210 include, but may not be limited to, sound sensors, such as, microphone sensors (i.e., an audio input device) or sound actuators, such as, speakers (i.e., an audio output device).

The NLP model 212 may include suitable logic, circuitry, and/or interfaces that may be configured to process the one or more first audio signals or the one or more second audio signals captured by the circuitry 202. In some embodiments, the NLP model 212 may be a machine learning-based model. The NLP model 212 may be configured to convert audio information, in the one or more first audio signals or the one or more second audio signals, to textual information. The NLP model 212 may be further configured to execute text processing operations, such as, but not limited to, a determination of parts-of-speech of a sentence in the textual information, an interpretation of a context of the sentence, a determination of a summary of the textual information, a determination of a sentiment associated with the sentence and/or the textual information, or a determination of the voice command of the user 112. The NLP model 212 may be configured to detect presence or absence of the challenge key-phrase (generated by the circuitry 202) in text information extracted from the one or more first audio signals. The NLP model 212 may be configured to detect the voice command, received from the user 112, from text information extracted from the one or more second audio signals. The NLP model 212 may process the detected voice command to determine one or more instructions (relevant to control of features or settings of the wearable device 102 or the electronic device 104) specified in the detected voice command. The NLP model 212 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The NLP model 212 may be further configured to identify the voice of the user 112 in the captured one or more first audio signals or the captured one or more second audio signals. The voice of the user 112 may be identified based on one or more voice parameters associated with a voice model of the user 112 stored in the memory 204. The one or more voice parameters may include, but are not limited to, a loudness parameter, an intonation parameter, an intensity of overtones, a voice modulation parameter, a pitch parameter, a tone parameter, a rate-of-speech parameter, a voice quality parameter, a phonetic parameter, a pronunciation parameter, a prosody parameter, a timbre parameter, and one or more psychoacoustic parameters.

In an embodiment, the NLP model 212 may correspond to a neural network. The neural network may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before, while training, or after training the neural network on a training dataset.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different same mathematical function.

In training of the neural network, one or more parameters of each node of the neural network may be updated based on whether an output of the final layer for a given input (from the training dataset) matches a correct result based on a loss function for the neural network. The above process may be repeated for same or a different input till a minima of loss function may be achieved, and a training error may be minimized. Several methods for training are known in art, for example, gradient descent, stochastic gradient descent, batch gradient descent, gradient boost, meta-heuristics, and the like.

The neural network may include electronic data, which may be implemented as, for example, a software component of an application executable on the wearable device 102, the electronic device 104, or the server 106. The neural network may rely on libraries, external scripts, or other logic/instructions for execution by a processing device, such as <processor/circuitry>. The neural network may include code and routines configured to enable a computing device, such as circuitry 202 to perform one or more operations for natural language processing associated with the NLP model 212. Additionally, or alternatively, the neural network may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

Examples of the neural network may include, but are not limited to, a deep neural network (DNN), an artificial neural network (ANN), a recurrent neural network (RNN), a Long Short-Term Memory (LSTM) network based RNN, LSTM+ANN, a gated recurrent unit (GRU)-based RNN, a fully connected neural network, a Connectionist Temporal Classification (CTC) based RNN, and/or a combination of such networks. In some embodiments, a learning engine of the neural network may include numerical computation techniques using data flow graphs. In certain embodiments, the neural network may be based on a hybrid architecture of multiple Deep Neural Networks (DNNs).

The functions or operations executed by the wearable device 102, as described in FIG. 1, may be performed by the circuitry 202. Operations executed by the circuitry 202 are described in detail, for example, in FIGS. 3, 4A, 4B, and 4C.

Figure 3:
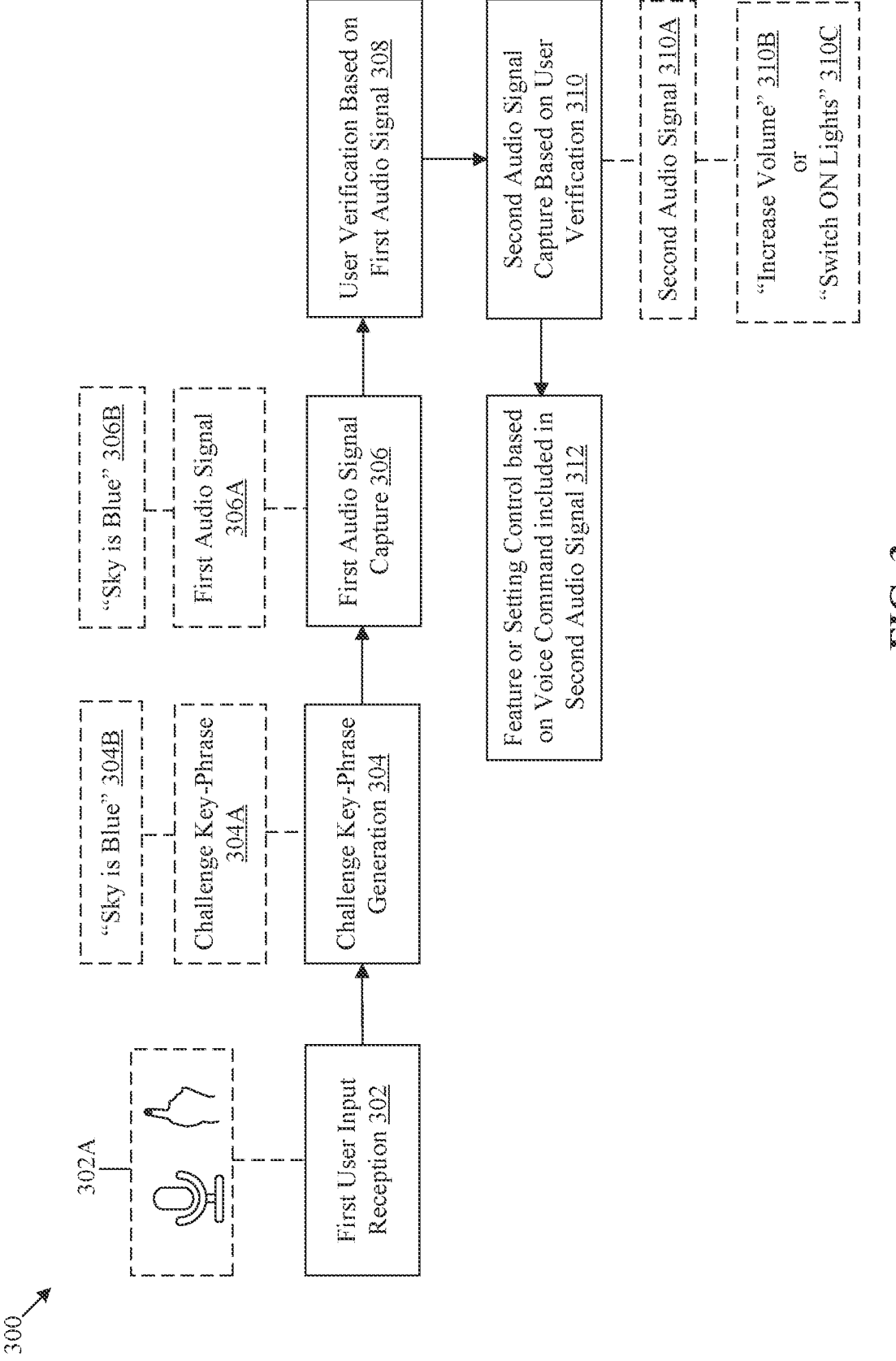
FIG. 3 is a diagram that illustrates an exemplary execution pipeline for control of a wearable device, or an electronic device, based on a voice command received from a verified user, in accordance with an embodiment of the disclosure.

FIG. 3 is a diagram that illustrates an exemplary execution pipeline for control of a wearable device, or an electronic device, based on a voice command received from a verified user, in accordance with an embodiment of the disclosure. FIG. 3 is explained in conjunction with elements from FIG. 1 and FIG. 2. With reference to FIG. 3, there is shown an exemplary pipeline 300. The exemplary pipeline 300 may include a set of operations (for example, operations 302 to 312) that may be executed by one or more components of FIG. 1, such as, the wearable device 102. The set of operations may be performed by the wearable device 102 to control a feature or a setting of at least one of the wearable device 102 or the electronic device 104, based on the voice command of the user 112 verified by the wearable device 102.

At 302, a first user input (e.g., a first user input 302A) may be received. The circuitry 202 may be configured to receive the first user input 302A. The first user input 302A may be a voice-based input or a touch-based input. The first user input may be indicative of a user-intention to control a feature or a setting of the wearable device 102 or the electronic device 104. In accordance with an embodiment, the first user input 302A may be an audio signal that includes a request to use the feature or change the setting. The voice-based input may be received via a microphone of the wearable device 102. For example, the voice-based input may be a word (for example, "unlock") or a phrase (for example, "unlock the voice assistant" (in the wearable device 102 or the electronic device 104)). The touch-based input may be received on a region of the wearable device 102 that may be sensitive to pressure or touch. The wearable device 102 may be further configured to trigger user-authentication via generation of a challenge key-phrase based on the reception of the request or detection of the pressure on the region.

At 304, a challenge key-phrase (e.g., a challenge key-phrase 304A) may be generated. The circuitry 202 may be configured to generate the challenge key-phrase 304A based on the received first user input 302A. The generated challenge key-phrase 304A may include a set of words. For example, the challenge key-phrase 304A may be a key-phrase 304B, such as, "sky is blue". In accordance with an embodiment, the circuitry 202 may select the set of words from a set of predefined words to generate the challenge key-phrase 304A. The circuitry 202 may be configured to obtain the set of predefined words from the server 106. In accordance with another embodiment, the circuitry 202 may pre-select the set of words based on a user-input from the user 112. The user-input may be received during a configuration of the wearable device 102 by the user 112. The circuitry 202 may be generate the challenge key-phrase 304A based on the pre-selected set of words.

The circuitry 202 may be further configured to render a message that includes the generated challenge key-phrase 304A. The message may be rendered through an audio output device (for example, a sound actuator of the sensors and actuators 210) of the wearable device 102. In accordance with an embodiment, the rendered message may be an audio message. The audio output device may playback an audio message, such as, "say sky is blue" or "please say sky is blue". The circuitry 202 of the wearable device 102 (for example, hearing-aid device or headphone) may playback the audio message through the audio output device. In some embodiments, the message (that includes the generated challenge key-phrase 304A) may be rendered visually. The circuitry 202 of the wearable device 102 (for example, smart glasses) may display the message "say sky is blue" or "please say sky is blue" as a text on the display screen of the display device 214. Some other examples of messages may include, but are not limited to, "please say OK to confirm", "please say CORRECT to confirm", "please say FINE to confirm", or "please say YES to confirm". In some embodiments, the message may be rendered through audio-visually, wherein the audio output device may playback the audio message and the display device 214 may display the text message. The circuitry 202 of the wearable device 102 (for example, HMD, HUD, AR goggle, or VR goggle) may playback the audio message through the audio output device and display the text message via the display device 214.

At 306, a first audio signal (e.g., a first audio signal 306A) may be captured. The circuitry 202 may be further configured to capture the first audio signal 306A of one or more first audio signals corresponding to the rendered message. The circuitry 202 may capture the one or more first audio signals including the first audio signal 306A through an audio input device (for example, a sound sensor of the sensors and actuators 210). In accordance with an embodiment, the first audio signal 306A may be captured based on a spoken response to the rendered message (rendered audibly, visually, or audio-visually). The spoken response may be provided by the user 112 based on the message rendered audibly, visually, or audio-visually to the user 112. For example, the captured first audio signal 306A may correspond to a spoken response 306B, such as, "sky is blue".

In some embodiments, the one or more first audio signals may be captured from one or more directions. The circuitry 202 may be configured to determine that a first audio signal (e.g., the first audio signal 306A) of the one or more first audio signals may be associated with a first sound direction. Similarly, the circuitry 202 may be configured to determine that a second audio signal of the one or more first audio signals may be associated with a second sound direction. The first direction may correspond to a bone of an ear of the user 112, and the second sound direction may correspond to a larynx of the user 112. Details related to the determination of the first audio signal associated with the first sound direction and the determination of the second audio signal associated with the second sound direction are explained further, for example, in FIG. 5.

At 308, the user 112 may be verified based on the captured first audio signal 306A. The circuitry 202 may be further configured to verify the user 112 based on the captured first audio signal 306A. The circuitry 202 may be configured to determine whether the captured first audio signal 306A includes the generated challenge key-phrase. As the first audio signal 306A is captured based on the spoken response of the user 112 to the rendered message (that instructs the user 112 to recite the challenge key-phrase), the spoken response may include a recitation of the challenge key-phrase by the user 112. The circuitry 202 may be configured to determine the user 112 as an authentic user based on the determination that the captured first audio signal 306A (spoken response) includes the generated challenge key-phrase. In case the spoken response is determined to not include the generated challenge key-phrase, the circuitry 202 may not accept subsequent voice commands that may be received from the user 112 to control the features and settings of the wearable device 102 or the electronic device 104. In some embodiments, the circuitry 202 may be configured to render a message that indicates whether the user 112 has been verified. For example, the rendered message may indicate that the wearable device 102 may be ready to accept voice commands from the user 112 if the user 112 has been verified. Similarly, if the user 112 is not verified, the rendered message may prompt the user 112 to provide another user input to trigger generation of another challenge key-phrase.

In some embodiments, the circuitry 202 may be configured to determine whether the first audio signal 306A (or the one or more first audio signals) is captured within a pre-defined time period from the rendering of the message by the audio output device of the wearable device 102. The circuitry 202 may verify the user 112 based on the determination that the first audio signal 306A (or the one or more first audio signals) has been captured within the pre-defined time period. The circuitry 202 may be configured to start a timer at a time instance related to the rendering of the message that includes the generated challenge key-phrase. The circuitry 202 may be configured to pause/stop the timer based on the determination that the first audio signal 306A is captured within the pre-defined time period. For example, the pre-defined time period may be in seconds (like 45 seconds or 60 seconds). The user 112 may be verified if the first audio signal 306A is captured within the pre-defined time period (i.e., 45 seconds or 60 seconds) of rendering of the message, and if the first audio signal 306A includes the challenge key-phrase. The timer may be stopped when the first audio signal 306A is captured.

The timer may be configured to expire after the pre-defined time period. The user 112 may not be verified if the timer expires prior to the capture of the first audio signal 306A (even if the captured first audio signal 306A includes the challenge key-phrase). For example, if the first audio signal 306A is not captured within the pre-defined time period (45 seconds or 60 seconds) of rendering of the message (that includes the challenge key-phrase), the timer may expire. Further, the user 112 may not be verified if the captured first audio signal 306A does not include the challenge key-phrase (even if the first audio signal 306A is captured within the predefined time period or prior to the expiry of the timer).

In some embodiments, the circuitry 202 may be configured to identify a voice of the user 112 in the captured first audio signal 306A (or the one or more first audio signals). The first audio signal 306A may correspond to the spoken response of the user 112 to the rendered message that includes the challenge key-phrase. The circuitry 202 may determine one or more voice parameters from the spoken response. The circuitry 202 may compare the one or more voice parameters, determined from the spoken response, with a voice model that comprises one or more parameters of the voice of the user 112. The circuitry 202 may be further configured to verify the user 112 based on the identification of the voice of the user 112 in the spoken response. The voice of the user 112 may be identified if the one or more voice parameters, determined from the spoken response, match one or more parameters of the voice the user 112. However, the circuitry 202 may verify the user 112 only if the spoken response (in which the voice of the user 112 has been identified) includes the challenge key-phrase.

The user 112 may not be verified if the voice of the user 112 is not identified in the spoken response. For example, in case one or more voice parameters, determined from the spoken response (that includes the challenge key-phrase), do not match one or more parameters of the voice the user 112, the user 112 may not be verified.

In some embodiments, the circuitry 202 may be configured to determine a time lag or a phase lag between the determined first audio signal (of one or more first audio signals) associated with the first sound direction and the determined second audio signal (of one or more first audio signals) associated with the second sound direction. The first audio signal (captured from the first direction, for example, a direction that may correspond to the bone of the ear of the user 112) may lead the second audio signal (captured from the second sound direction, for example, a direction that may correspond to the larynx of the user 112). The first audio signal may be captured prior to the capture of the second audio signal, as sound may travel faster through the bone as compared to the air from the larynx.

The circuitry 202 may be configured to compare the determined time lag or phase lag with a predefined threshold value. The circuitry 202 may set the predefined threshold value based on an expected time lag or phase lag between audios that travel through the bone and air (i.e., from the direction of the larynx). The circuitry 202 may further determine, based on the comparison, that the first audio signal and the second audio signal are identical. The first audio signal and the second audio signal may be determined as identical, if the first audio signal and the second audio signal are captured based on the spoken response of the user 112. The circuitry 202 may be further configured to verify the user 112 based on the comparison. The user 112 may be verified if the determined time lag or phase lag match the predefined threshold value, and the first audio signal and the second audio signal are identical. However, the circuitry 202 may verify the user 112 only if the spoken response includes the challenge key-phrase. Details related to the authentication of the user based on audio signals captured from two different directions are explained further, for example, in FIG. 5.

At 310, a second audio signal 310A may be captured based on the authentication of the user 112. The circuitry 202 may be configured to capture the second audio signal 310A (of one or more second audio signals) based on the authentication of the user 112. The second audio signal 310A may correspond to a second user input that may include a voice command. The circuitry 202 may be configured to respond to the voice command if the user 112 is verified. In accordance with an embodiment, the circuitry 202 may be configured to respond to the voice command if the second audio signal 310A (that includes the voice command) is captured within a predefined time period from the authentication of the user 112. For example, the circuitry 202 may respond to the voice command if the second audio signal 310A is captured within a minute from the authentication of the user 112.

The voice command, received from the user 112, may be associated with the control of the features or the settings of the wearable device 102 or the electronic device 104. For example, the second audio signal 310A may include a voice command 310B (such as, "increase volume") or a voice command (such as, "switch ON lights"). The circuitry 202 may be configured to determine, by use of the NLP model 212, that the voice command 310B (i.e., "increase volume") may be associated with control of a setting (for example, a volume setting) of the wearable device 102. Similarly, the circuitry 202 may determine that the voice command 310C (i.e., "switch ON lights") may be associated with control of a feature (for example, voice assistant feature of the wearable device 102 or the electronic device 104) to switch ON a lighting fixture. The voice command "switch ON lights" 310C may also be associated with usage of the voice assistant feature of the wearable device 102 to control a setting (for example, "turn ON") of the electronic device 104 (for example, lighting fixture).

At 312, a feature or a setting, of at least one of the wearable device 102 or the electronic device 104 associated with the wearable device 102, may be controlled based on the voice command included in the second audio signal 310A. The circuitry 202 may be configured to control the feature or the setting of at least one of the wearable device 102 or the electronic device 104, based on the voice command included in the second audio signal 310A. In accordance with an embodiment, the feature may correspond to a voice assistance feature of the wearable device 102 or the electronic device 104. The setting may correspond to at least one of an audio setting (like a volume setting), a display setting, a network setting, an accessibility setting, or an audio channel setting. For example, the circuitry 202 may control (for example, increase) a setting (for example, the volume) of the wearable device 102 based on the voice command 310B (i.e., "increase volume"). Similarly, the circuitry 202 may control (for example, "turn ON") a setting (for example, a bulb) of the lighting fixture (i.e., the electronic device 104) based on the voice command 310C (i.e., "switch ON lights"). The circuitry 202 may control the feature (for example, the voice assistant feature) of the wearable device 102 to turn ON the lighting fixture.

In some embodiments, the circuitry 202 may be configured to receive a touch input based on the capture of the second audio signal 310A (of the one or more second audio signals). The circuitry 202 may be configured to process the second audio signal 310A to detect, and respond to, the voice command included in the captured second audio signal 310A, based on reception of the touch input. If the touch input is not received, the captured second audio signal 310A may not be processed (by the NLP model 212) for detection of the voice command.

The circuitry 202 may be further configured to determine whether the touch input is received within a predefined time-period from the capture of the second audio signal 310A (or the one or more second audio signals). For example, the predefined time-period may be set to certain seconds (like 30 seconds). The circuitry 202 may be configured to determine whether the touch input has been received within the predefined time-period (like 30 seconds) of the capture of the second audio signal 310A. The circuitry 202 may be further configured to control the feature or the setting of the wearable device 102 or the electronic device 104 based on the determination that the touch input is received within the predefined time-period. For example, the circuitry 202 may be configured to control the feature or the setting of the wearable device 102 or the electronic device 104 based on the voice command if the second audio signal 310A is captured within the predefined time-period.

Typically, a voice-enabled wearable device may have the capability to respond to voice commands of a user who wears the voice-enabled wearable device. However, there may be issues associated with a usage and control of the voice-enabled wearable device. For example, if an environment of the user is exposed to ambient noise, voice recognition of the user may be inaccurate or complex and it may be difficult to identify whether a detected voice command has been issued by the user who wears the wearable device. There may be unforeseen consequences in an event of execution of a voice command, by the voice-enabled wearable device, that has not been issued by the user wearing the voice-enabled wearable device. For example, the voice-enabled wearable device may be a hearing-aid. In a noisy environment, the hearing-aid may detect a voice command to reduce the volume of the hearing-aid. The voice command may be issued by an individual who may be in the vicinity of the user who wears the hearing-aid. In this scenario, if there is a failure in recognition of the user's voice and the voice command is executed, the hearing-aid may become unusable by the user due to a low volume of the hearing-aid. For example, in such scenario, the user who wears the hearing-aid may not be able to hear ambient sounds due to the reduction of the volume of the hearing-aid and may also not be able to determine the cause as to why the user is unable to hear the ambient sounds.

In order to address such issues, the disclosed wearable device 102 may enable the authentication of the user 112 who wears the wearable device 102, based on a spoken response of the user 112 to a message that may be generated by the wearable device 102 and accessible only to the user 112 who wears the wearable device 102. The wearable device 102 may generate a challenge key-phrase and render a message that includes the generated challenge key-phrase. The rendered message may be accessible only to the user 112. The user 112 may be verified if the received spoken response to the rendered message includes the generated challenge key-phrase. Thus, the authentication may be user-specific and other users in the vicinity of the user 112 (i.e., who wears the wearable device 102) may not be able to predict the challenge key-phrase that may be generated by the wearable device 102 to respond to the rendered message.

The wearable device 102 may enable the control of features and settings of the wearable device 102 and other electronic devices (such as, the electronic device 104) associated with the wearable device 102, once the user 112 has been verified. Typically, wearable devices may include limited functionalities and capabilities, such as a small display and resolution, limited natural language processing capabilities, and limited user interface (UI) features. The control of the features and settings of the conventional wearable device and/or the other electronic devices based on limited user interface elements and limited display resources of the typical wearable device may be cumbersome. The wearable device 102 of the disclosure may provide voice commands-based control of the wearable device 102 and/or other electronic devices, once the user 112 may be verified. The voice command-based control may be an elegant solution to as compared to other commands provided through the limited user interface elements and limited touch-based display resources, as a voice command may be issued easily by the user 112 without the use of the limited UI elements of the conventional wearable devices. Also, as the user 112 may be verified based on the user's response to the challenge message (i.e., played back exclusively to the user 112), such authentication may ensure that the voice command may be received from a genuine user who actually wears the wearable device 102 at that time. Therefore, no other person may be able to predict the challenge message as the voice command may be played back exclusively to the user 112 who wears the wearable device 102. Thus, unwanted voice commands or noise may be filtered-out and the wearable device 102 and/or the electronic device 104 may be appropriately controlled based on the voice command.

Figures 4A, 4B, 4C:
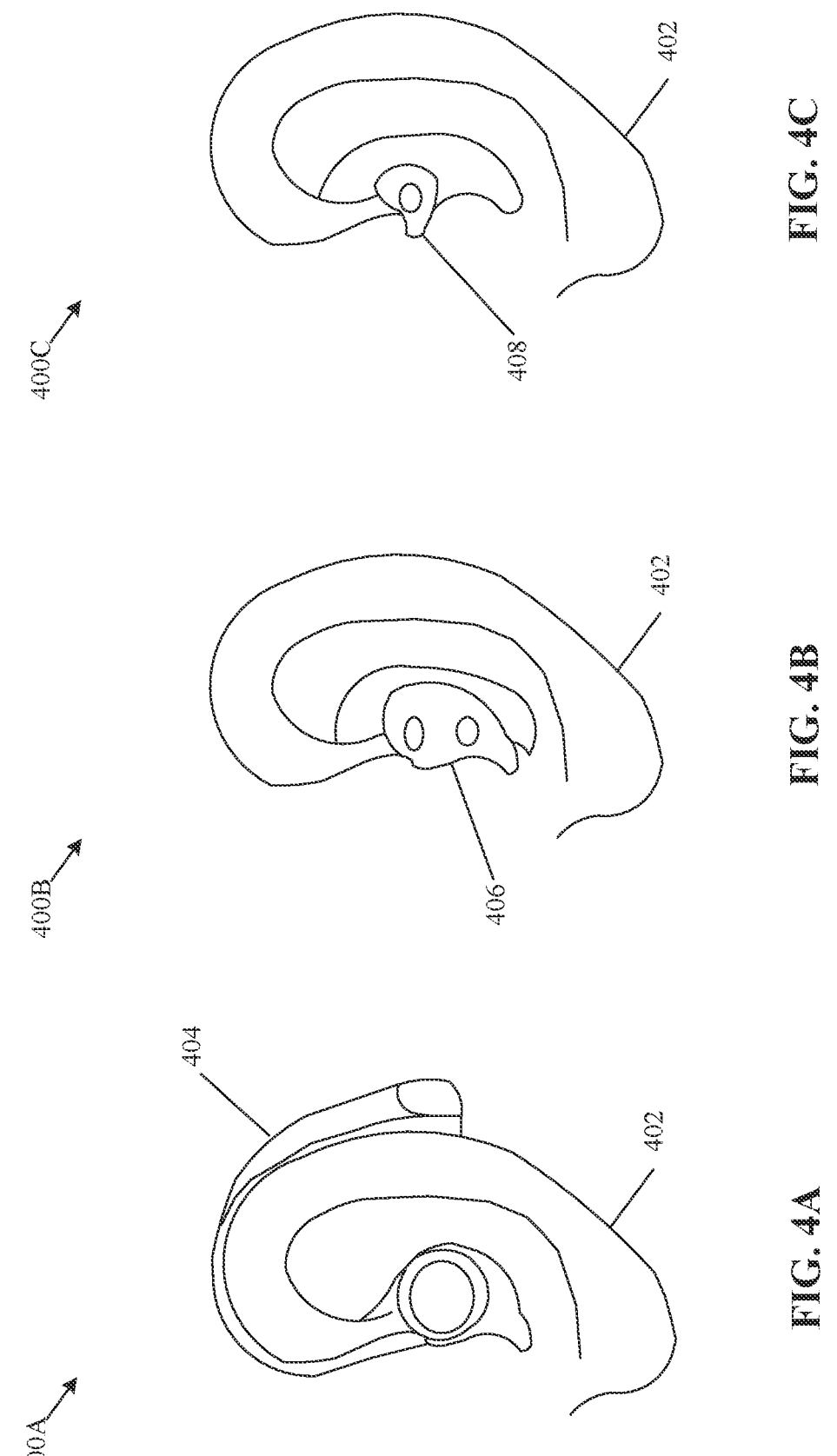
FIG. 4A is a diagram that illustrates an exemplary scenario of a first anatomical position to wear an exemplary wearable device with respect to an ear of a user, in accordance with an embodiment of the disclosure.
FIG. 4B is a diagram that illustrates an exemplary scenario of a second anatomical position to wear an exemplary wearable device with respect to an ear of a user, in accordance with an embodiment of the disclosure.
FIG. 4C is a diagram that illustrates an exemplary scenario of a third anatomical position to wear an exemplary wearable device with respect to an ear of a user, in accordance with an embodiment of the disclosure.

FIG. 4A is a diagram that illustrates an exemplary scenario of a first anatomical position to wear an exemplary wearable device with respect to an ear of a user, in accordance with an embodiment of the disclosure. FIG. 4A is explained in conjunction with elements from FIG. 1, FIG. 2, and FIG. 3. With reference to FIG. 4A, there is shown an exemplary scenario 400A. In the scenario 400A, there is shown a wearable device 404 (for example, a hearing aid) that may be worn by a user (for example, the user 112) at an exemplary first anatomical position with respect to an ear 402 of the user 112. The wearable device 404 may be an exemplary implementation of the wearable device 102. Therefore, functionalities of the wearable device 404 may be identical to that of the wearable device 102 of FIG. 1 or FIG. 2. The wearable device 404 may include an audio input device (for example, a microphone) that may be located at the back (or top) of the ear 402. The wearable device 404 may include an audio output device (for example, a speaker) that may be located inside the ear canal of the ear 402. The wearable device 404 may include features and settings that may be controlled by the user 112 through voice commands captured by the audio input device of the wearable device 404.

The wearable device 404 may be configured to receive voice inputs and touch inputs. The wearable device 404 may be configured to generate a challenge key-phrase. The wearable device 404 may be further configured to render an audio message through the audio output device of the wearable device 404. The rendered audio message may include the generated challenge key-phrase. The wearable device 404 may be further configured to capture the one or more first audio signals that may include the challenge key-phrase. The wearable device 404 may be further configured to verify the user 112 based on the inclusion of the challenge key-phrase in the one or more first audio signals. The wearable device 404 may be further configured to capture one or more second audio signals that may include a voice command. The wearable device 404 may be further configured to control the features or settings of the wearable device 404 or another electronic device (e.g., the electronic device 104) associated with the wearable device 404 based on the voice command, as described further, for example, in FIGS. 1 and 3.

FIG. 4B is a diagram that illustrates an exemplary scenario of a second anatomical position to wear an exemplary wearable device with respect to an ear of a user, in accordance with an embodiment of the disclosure. FIG. 4B is explained in conjunction with elements from FIG. 1, FIG. 2, FIG. 3, and FIG. 4A. With reference to FIG. 4B, there is shown an exemplary scenario 400B. In the scenario 400B, there is shown a wearable device 406 (for example, a hearing aid) that may be worn by a user (for example, the user 112) at an exemplary second anatomical position with respect to the ear 402 of the user 112. The wearable device 406 may be an exemplary implementation of the wearable device 102. Therefore, functionalities of the wearable device 406 may be identical to that of the wearable device 102 of FIG. 1 or FIG. 2. The wearable device 406 may include an audio input device (for example, a microphone) that may be located at an entrance of an ear canal of the ear 402. The wearable device 406 may include an audio output device (for example, a speaker) that may be located inside the ear canal of the ear 402. The wearable device 406 may include features and settings that may be controlled (based on the authentication of the user 112) through voice commands from the user 112 captured by the audio input device of the wearable device 406, as described further, for example, in FIGS. 1 and 3.

FIG. 4C is a diagram that illustrates an exemplary scenario of a third anatomical position to wear an exemplary wearable device with respect to an ear of a user, in accordance with an embodiment of the disclosure. FIG. 4C is explained in conjunction with elements from FIG. 1, FIG. 2, FIG. 3, FIG. 4A, and FIG. 4B. With reference to FIG. 4C, there is shown an exemplary scenario 400C. In the scenario 400C, there is shown a wearable device 408 (for example, a hearing aid) that may be worn by a user (for example, the user 112) at an exemplary third anatomical position with respect to the ear 402 of the user 112. The wearable device 408 may be an exemplary implementation of the wearable device 102. Therefore, functionalities of the wearable device 408 may be identical to that of the wearable device 102 of FIG. 1 or FIG. 2. The wearable device 408 may include an audio input device (for example, a microphone) that may be located inside the ear canal of the ear 402. The wearable device 406 may include an audio output device (for example, a speaker) that may also be located inside the ear canal of the ear 402. The wearable device 408 may include features and settings that may be controlled (based on the authentication of the user 112) through voice commands captured from the user 112 by the audio input device of the wearable device 408, as described further, for example, in FIGS. 1 and 3.

It should be noted that the scenarios 400A, 400B, and 400C of FIGS. 4A, 4B, and 4C, respectively, are for exemplary purposes and should not be construed to limit the scope of the disclosure.

Figure 5:
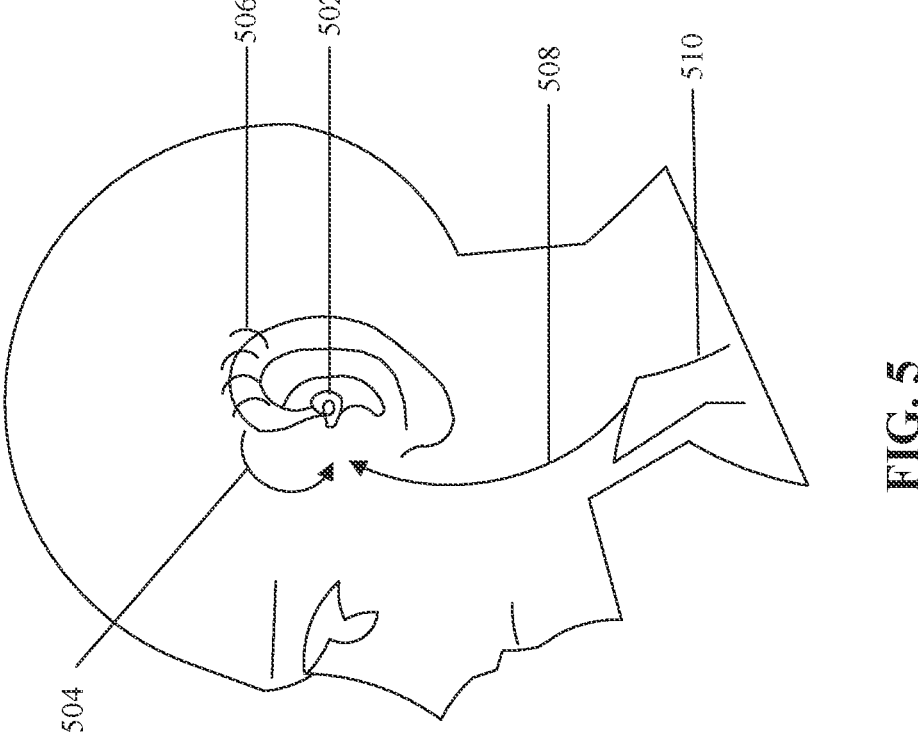
FIG. 5 is a diagram that illustrates an exemplary scenario for authentication of a user based on comparison of audio signals associated with sound directions, in accordance with an embodiment of the disclosure.
Figure 5:

FIG. 5 is a diagram that illustrates an exemplary scenario for authentication of a user based on comparison of audio signals associated with different sound directions, in accordance with an embodiment of the disclosure. FIG. 5 is explained in conjunction with elements from FIG. 1, FIG. 2, FIG. 3, FIG. 4A, FIG. 4B, and FIG. 4C. With reference to FIG. 5, there is shown an exemplary scenario 500. In the scenario 500, there is shown a wearable device 502 (for example, a hearing aid) that may be worn by a user (for example, the user 112). The wearable device 404 may be an exemplary implementation of the wearable device 102. Therefore, functionalities of the wearable device 502 may be identical to that of the wearable device 102 of FIG. 1 or FIG. 2. The wearable device 502 may capture the one or more first audio signals corresponding to the rendered message. In accordance with an embodiment, the wearable device 502 may determine a first audio signal (of the one or more first audio signals) associated with a first sound direction 504. The first sound direction 504 may correspond to a bone 506 of an ear of the user 112. The wearable device 502 may determine a second audio signal (of the one or more first audio signals) associated with a second sound direction 508. The second sound direction 508 may correspond to a larynx 510 of the user 112.

The circuitry 202 may be configured to determine the first audio signal based on the capture of the one or more first audio signals from the first sound direction 504. Similarly, the second audio signal may be determined based on the capture of the one or more first audio signals from the second sound direction 508. The circuitry 202 may be configured to process the first audio signal and/or the second audio signal to determine whether the first audio signal and/or the second audio signal include the generated challenge key-phrase. The circuitry 202 may be further configured to determine one or more of time lag or phase lag between the determined first audio signal and the determined second audio signal. In an embodiment, the determination of the time lag or the phase lag may be based on inclusion of the generated challenge key-phrase in the first audio signal and the second audio signal. In such scenario, the time lag or the phase lag may not be determined if it is determined that either or both of the first audio signal and the second audio signal do not include the generated challenge key-phrase.

In accordance with an embodiment, a sound associated with the first audio signal associated with the first sound direction 504, that corresponds to the bone 506 of the ear of the user 112, may travel faster than a sound associated with the second audio signal. Therefore, the second audio signal associated with the second sound direction 508, that corresponds to the larynx 510 of the user 112, may be captured after the reception of the first audio signal. The second audio signal may lag, with respect to the first audio signal, in terms of the time instant of reception at the wearable device 502 and relative phase angle between the first audio signal and the second audio signal. The circuitry 202 may be further configured to compare the determined time lag or phase lag with a predefined threshold value. The circuitry 202 may be configured to set a static predefined threshold value or a dynamic predefined threshold value for the time lag or the phase lag. In some embodiments, the predefined threshold value of the time lag or the phase lag may be updated based on characteristics of the voice of the user 112.

The circuitry 202 may be further configured to determine, based on the comparison of the time lag or phase lag, whether the first audio signal and the second audio signal are captured based on a response spoken by the user 112 to a rendered message. The rendered message may include the generated challenge key-phrase. The circuitry 202 may determine that the first audio signal and the second audio signal are captured based on the spoken response of the user 112, if the determined time lag or the phase lag is equal to (or less than) the predefined threshold value of time lag or phase lag. Further, the circuitry 202 may determine that the first audio signal and the second audio signal are identical, if the first audio signal and the second audio signal include the challenge key-phrase.

The circuitry 202 may be further configured to verify the user 112 based on the comparison. The results of the comparison may indicate that the spoken response of the user 112 correspond to the first audio signal and the second audio signal. The circuitry 202 may be further configured to capture voice commands from the user 112, based on the authentication of the user 112, to control a feature or a setting of the wearable device 502 or an electronic device associated with the wearable device 502.

It should be noted that the scenario 500 of FIG. 5 is for exemplary purposes and should not be construed to limit the scope of the disclosure.

FIG. 6 is a flowchart that illustrates operations for an exemplary method for control of settings or features of a wearable electronic device and/or an electronic device based on a voice command of a verified user, in accordance with an embodiment of the disclosure. FIG. 6 is explained in conjunction with elements from FIGS. 1, 2, 3, 4A, 4B, 4C, and 5. With reference to FIG. 6, there is shown a flowchart 600. The operations from 602 to 618 may be implemented by any computing system, such as, by the wearable device 102 of FIG. 1. The operations may start at 602 and may proceed to 604.

At 604, a first user input may be received. In at least one embodiment, the circuitry 202 may be configured to receive the first user input. The details of reception of the first user input, are described, for example, in FIG. 1 and FIG. 3 (at 302).

At 606, a challenge key-phrase may be generated based on the received first user input. In at least one embodiment, the circuitry 202 may be configured to generate the challenge key-phrase based on the received first user input. The details of the generation of the challenge key-phrase are described, for example, in FIG. 1 and FIG. 3 (at 304).

At 608, a message, including the generated challenge key-phrase, may be rendered, through an audio output device of the wearable device 102. In at least one embodiment, the circuitry 202 may be configured to render the message including the generated challenge key-phrase, through the audio output device of the wearable device 102. The details of the rendering of the message including the generated challenge key-phrase, are described, for example, in FIG. 1 and FIG. 3 (at 304).

At 610, one or more first audio signals corresponding to the rendered message may be captured. In at least one embodiment, the circuitry 202 may be configured to capture the one or more first audio signals corresponding to the rendered message. The details of capture of the one or more first audio signals, are described, for example, in FIG. 1 and FIG. 3 (at 306).

At 612, an inclusion of the generated challenge key-phrase in the captured one or more first audio signals may be determined. In at least one embodiment, the circuitry 202 may be configured to determine whether the captured one or more first audio signals include the generated challenge key-phrase. The details of determination of whether the captured one or more first audio signals include the generated challenge key-phrase, are described, for example, in FIG. 1 and FIG. 3 (at 308).

At 614, the user 112 may be verified based on the determination that the captured one or more first audio signals include the generated challenge key-phrase. In at least one embodiment, the circuitry 202 may be configured to verify the user 112 based on the determination that the captured one or more first audio signals include the generated challenge key-phrase. The details of authentication of the user 112 based on the captured one or more first audio signals, are described, for example, in FIG. 1 and FIG. 3 (at 308).

At 616, one or more second audio signals, corresponding to a second user input including a voice command, may be captured based on the authentication of the user 112. In at least one embodiment, the circuitry 202 may be configured to capture the one or more second audio signals corresponding to the second user input including the voice command, based on the authentication of the user 112. The details of capture of the one or more second audio signals corresponding to the second user input, are described, for example, in FIG. 1 and FIG. 3 (at 310).

At 618, a feature or a setting of at least one of the wearable device 102 or the electronic device 104 associated with the wearable device 102, may be controlled based on the voice command. In at least one embodiment, the circuitry 202 may be configured to control the feature or the setting of at least one of the wearable device 102 or the electronic device 104 associated with the wearable device 102, based on the voice command. The details of control the feature or the setting of at least one of the wearable device 102 or the electronic device 104, are described, for example, in FIG. 1 and FIG. 3 (at 312). Control may pass to end.

Although the flowchart 600 is illustrated as discrete operations, such as 604, 606, 608, 610, 612, 614, 616, and 618, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate a wearable device (such as the wearable device 102). The computer-executable instructions may cause the machine and/or computer to perform operations that may include reception of a first user input. The operations may further include generation of a challenge key-phrase based on the received first user input. The operations may further include rendering of a message that includes the generated challenge key-phrase, through an audio output device of the wearable device 102. The operations may further include capture of one or more first audio signals corresponding to the rendered message. The operations may further include determination of whether the captured one or more first audio signals include the generated challenge key-phrase. The operations may further include authentication of the user 112 based on the determination that the captured one or more first audio signals include the generated challenge key-phrase. The operations may further include capture of one or more second audio signals corresponding to a second user input that includes a voice command, based on the authentication of the user 112. The operations may further include control of a feature or a setting of at least one of the wearable device 102 or an electronic device 104 associated with the wearable device 102, based on the voice command.

Exemplary aspects of the disclosure may include a wearable device (such as, the wearable device 102 of FIG. 1) that may include circuitry (such as, the circuitry 202), that may be communicatively coupled to an electronic device (such as, the electronic device 104 of FIG. 1). The wearable device 102 may further include memory (such as, the memory 204 of FIG. 2). The wearable device 102 may be one of a hearing-aid device, a headphone with an ability to receive ambient sound, smart glasses with an ability to receive ambient sound, a shoulder speaker with an ability to receive ambient sound, a neckband with an ability to receive ambient sound, a head mountable display (HMD)/heads-up display (HUD) with an ability to receive ambient sound, or an augmented reality (AR)/virtual reality (VR) goggles with an ability to receive ambient sound. The wearable device 102 may be worn on an ear of the user 112. The circuitry 202 may be configured to receive a first user input. The first user input may be one of a voice-based input or a touch-based input. The first user input may be indicative of a user-intention to control a feature or a setting of at least one of the wearable device 102 or an electronic device 104 associated with the wearable device 102. The circuitry 202 may be further configured to generate a challenge key-phrase based on the received first user input. The generated challenge key-phrase may include a set of words selected from a set of predefined words or pre-selected based on a user input from the user 112. The circuitry 202 may be further configured to render a message including the generated challenge key-phrase, through an audio output device of the wearable device 102. The circuitry 202 may be further configured to capture one or more first audio signals corresponding to the rendered message. The circuitry 202 may be further configured to determine whether the captured one or more first audio signals include the generated challenge key-phrase. The circuitry 202 may be further configured to verify the user 112 based on the determination that the captured one or more first audio signals include the generated challenge key-phrase. The circuitry 202 may be further configured to capture one or more second audio signals corresponding to a second user input including a voice command, based on the authentication of the user 112. The circuitry 202 may be further configured to control a feature or a setting of at least one of the wearable device 102 or an electronic device 104 associated with the wearable device 102, based on the voice command. The feature may correspond to a voice assistance feature. The setting may correspond to at least one of a volume setting, a display setting, a network setting, an accessibility setting, or an audio channel setting.

In accordance with an embodiment, the circuitry 202 may be further configured to determine whether the one or more first audio signals are captured within a pre-defined time period from the rendering of the message by the audio output device of the wearable device 102. The circuitry 202 may be further configured to verify the user 112 based on the determination that the one or more first audio signals are captured within the pre-defined time period.

In accordance with an embodiment, the circuitry 202 may be further configured to identify a voice of the user 112 in the captured one or more first audio signals. The circuitry 202 may be further configured to verify the user 112 based on the identification of the voice of the user 112.

In accordance with an embodiment, the circuitry 202 may be further configured to determine a first audio signal associated with a first sound direction of the captured one or more first audio signals. The first sound direction may correspond to a bone of an ear of the user 112. The circuitry 202 may be further configured to determine a second audio signal associated with a second sound direction of the captured one or more first audio signals. The second sound direction may correspond to a larynx of the user 112. The circuitry 202 may be further configured to determine at least one of a time lag or a phase lag between the determined first audio signal and the determined second audio signal. The circuitry 202 may be further configured to compare the determined at least one of the time lag or phase lag with a predefined threshold value. The circuitry 202 may be further configured to verify the user based on the comparison.

In accordance with an embodiment, the circuitry 202 may be further configured to receive a touch input based on the capture of the one or more second audio signals. The circuitry 202 may be further configured to determine whether the touch input is received within a predefined time-period from the capture of the one or more second audio signals. The control of the feature or the setting may be based on the determination that the touch input is received within the predefined time-period.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. A wearable device, comprising:
   circuitry configured to:
   receive a first user input;
   generate a challenge key-phrase based on the received first user input;
   render a message including the generated challenge key-phrase, through an audio output device of the wearable device;
   capture a plurality of first audio signals corresponding to the rendered message;
   determine a first audio signal, of the plurality of first audio signals, associated with a first sound direction;
   determine a second audio signal, of the plurality of first audio signals, associated with a second sound direction;
   determine that each of the first audio signal and the second audio signal includes the generated challenge key-phrase;
   determine at least one of a time lag or a phase lag between the first audio signal and the second audio signal;
   compare the at least one of the determined time lag or the determined phase lag with a threshold value;
   verify a user based on:
      the comparison, and
      the determination that the each of the first audio signal and the second audio signal includes the generated challenge key-phrase;
   capture, based on the verification of the user, at least one third audio signal corresponding to a second user input including a voice command; and
   control, based on the voice command, at least one of a feature or a setting of at least one of the wearable device or an electronic device associated with the wearable device.

2. The wearable device according to claim 1, wherein the wearable device comprises one of:
   a hearing-aid device, a headphone configured to receive ambient sound, smart glasses configured to receive the ambient sound, a shoulder speaker configured to receive the ambient sound, a neck-band speaker configured to receive the ambient sound, a head mountable display (HMD)/heads-up display (HUD) configured to receive the ambient sound, or an augmented reality (AR)/virtual reality (VR) goggles configured to receive the ambient sound.

3. The wearable device according to claim 1, wherein the first user input is one of a voice-based input or a touch-based input, and the first user input indicates a user-intention to control the at least one of the feature or the setting.

4. The wearable device according to claim 1, wherein the circuitry is further configured to:

determine that the plurality of first audio signals is captured within a specific time period from a time at which the message is rendered; and verify the user based on the determination that the plurality of first audio signals is captured within the specific time period.

5. The wearable device according to claim 1, wherein the circuitry is further configured to select a set of words from a plurality of specific words, and the generated challenge key-phrase includes the selected set of words.

6. The wearable device according to claim 1, wherein the circuitry is further configured to select a set of specific words based on the first user input, and the generated challenge key-phrase includes the selected set of specific words.

7. The wearable device according to claim 1, wherein the circuitry is further configured to:

identify a voice of the user in the first audio signal and the second audio signal; and verify the user based on the identification of the voice of the user.

8. The wearable device according to claim 1, wherein the first sound direction corresponds to a bone of an ear of the user, and the second sound direction corresponds to a larynx of the user.

9. The wearable device according to claim 1, wherein the circuitry is further configured to:

receive a touch input based on the capture of the at least one third audio signal;

determine that the touch input is received within a specific time-period from the capture of the at least one third audio signal; and control the at least one of the feature or the setting based on the determination that the touch input is received within the specific time-period.

10. The wearable device according to claim 1, wherein the feature corresponds to a voice assistance feature.

11. The wearable device according to claim 1, wherein the setting corresponds to at least one of a volume setting, a display setting, a network setting, an accessibility setting, or an audio channel setting.

12. The wearable device according to claim 1, wherein the wearable device is worn on an ear of the user.

13. A method, comprising:

in a wearable device:

receiving a first user input;

generating a challenge key-phrase based on the received first user input;

rendering a message including the generated challenge key-phrase, through an audio output device of the wearable device;

capturing a plurality of first audio signals corresponding to the rendered message;

determining a first audio signal, of the plurality of first audio signals, associated with a first sound direction;

determining a second audio signal, of the plurality of first audio signals, associated with a second sound direction;

determining that each of the first audio signal and the second audio signal includes the generated challenge key-phrase;

determining at least one of a time lag or a phase lag between the first audio signal and the second audio signal;

comparing the at least one of the determined time lag or the determined phase lag with a threshold value;

verifying a user based on;

the comparison, and the determination that the each of the first audio signal and the second audio signal includes the generated challenge key-phrase;

capturing, based on the verification of the user, at least one third audio signal corresponding to a second user input including a voice command; and controlling, based on the voice command, at least one of a feature or a setting of at least one of the wearable device or an electronic device associated with the wearable device.

14. The method according to claim 13, wherein the wearable device comprises one of:

a hearing-aid device, a headphone to receive ambient sound, smart glasses to receive the ambient sound, a shoulder speaker to receive the ambient sound, a neck-band speaker to receive the ambient sound, a head mountable display (HMD)/heads-up display (HUD) to receive the ambient sound, or an augmented reality (AR)/virtual reality (VR) goggles to receive the ambient sound.

15. The method according to claim 13, wherein the first user input is one of a voice-based input or a touch-based input, and the first user input indicates a user-intention to control the at least one of the feature or the setting.

16. The method according to claim 13, further comprising:

determining that the plurality of first audio signals is captured within a specific time period from a time of the rendering of the message; and verifying the user based on the determination that the plurality of first audio signals is captured within the specific time period.

17. The method according to claim 13, wherein the first sound direction corresponds to a bone of an ear of the user, and the second sound direction corresponds to a larynx of the user.

18. The method according to claim 13, further comprising:

receiving a touch input based on the capture of the at least one third audio signal;

determining that the touch input is received within a specific time-period from the capture of the at least one third audio signal; and controlling the at least one of the feature or the setting based on the determination that the touch input is received within the specific time-period.

19. A non-transitory computer-readable medium having stored thereon, computer-executable instructions that when executed by a wearable device, causes the wearable device to execute operations, the operations comprising:

receiving a first user input;

generating a challenge key-phrase based on the received first user input;

rendering a message including the generated challenge key-phrase, through an audio output device of the wearable device;

capturing a plurality of first audio signals corresponding to the rendered message;

determining a first audio signal, of the plurality of first audio signals, associated with a first sound direction;

determining a second audio signal, of the plurality of first audio signals, associated with a second sound direction;

determining that each of the first audio signal and the second audio signal includes the generated challenge key-phrase;

determining at least one of a time lag or a phase lag between the first audio signal and the second audio signal;

comparing the at least one of the determined time lag or the determined phase lag with a threshold value;

verifying a user based on;
    the comparison, and
    the determination that the each of the first audio signal and the second audio signal includes the generated challenge key-phrase;

capturing, based on the verification of the user, at least one third audio signal corresponding to a second user input including a voice command; and controlling, based on the voice command, at least one of a feature or a setting of at least one of the wearable device or an electronic device associated with the wearable device.

* * * * *